United States Patent

[11] 3,580,156

| [72] | Inventor | Peter Loseries<br>Diez, Germany |
|---|---|---|
| [21] | Appl. No. | 782,173 |
| [22] | Filed | Dec. 9, 1968 |
| [45] | Patented | May 25, 1971 |
| [73] | Assignee | Ernst Leitz GmbH<br>Wetzlar, Germany |
| [32] | Priority | Dec. 19, 1967 |
| [33] | | Germany |
| [31] | | P 15 97 308.7 |

[54] SWINGING SECTOR SHUTTER FOR PHOTOGRAPHIC CAMERAS
13 Claims, 10 Drawing Figs.

| [52] | U.S. Cl. | 95/60 |
|---|---|---|
| [51] | Int. Cl. | G03b 9/26 |

[50] Field of Search.......................................... 95/60, 55, (Inquired)

[56] References Cited
UNITED STATES PATENTS

| 2,927,519 | 3/1960 | Matsuda | 95/55 |
|---|---|---|---|
| 3,479,946 | 11/1969 | Bohm | 95/60 |

Primary Examiner—Samuel S. Matthews
Assistant Examiner—Richard L. Moses
Attorney—Kraft & Wells

ABSTRACT: This disclosure pertains to a camera shutter having two swinging sectors. Each sector includes a plurality of separately mounted lamellae actuated by pin and slit connections. The slit-forming edges of each are formed by a single lamella and by a plurality of adjacent lamellae.

INVENTOR
Peter Loseries
BY Krafft & Wells
ATTORNEYS

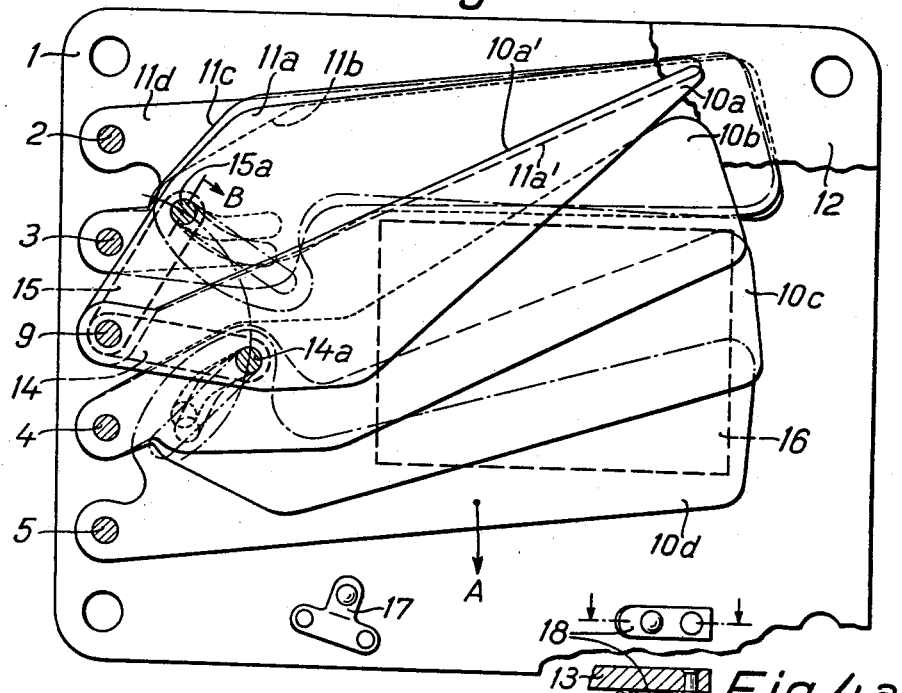
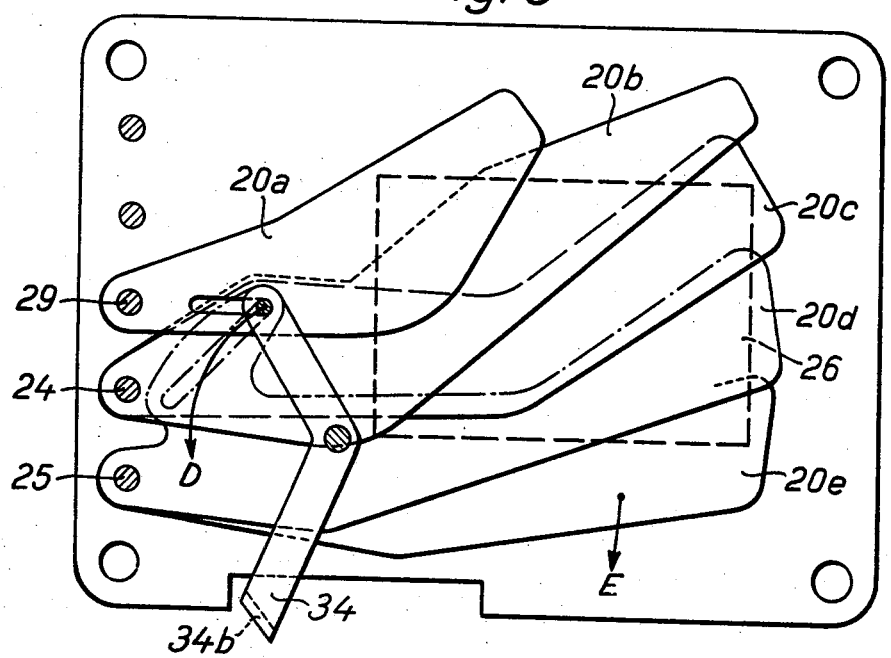

INVENTOR
Peter Loseries
BY *Krafft & Wells*
ATTORNEYS

INVENTOR
Peter Loseries
BY Krafft & Wells
ATTORNEYS

SWINGING SECTOR SHUTTER FOR PHOTOGRAPHIC CAMERAS

BACKGROUND OF THE INVENTION

The field of the invention is pivoted blade shutters for photographic cameras. The invention is particularly concerned with swinging sector shutters for photographic cameras, wherein the swinging shutters are divided into a plurality of lamellae.

In the swinging sector shutters, each swinging sector is divided into individual lamellae which overlap one another in their end position outside the picture window, but which in the window closing position at the other extremity of their movement are overlapped in telescopically fanned relation. In contrast to shutters with rigid individual blades or with rigid and generally rotatable discs, these new shutters have the advantage of requiring much less space because in one of their end positions the lamellae will telescope into one another.

In the devices of the prior art there has, however, been the difficulty that all the lamellae of at least one sector were mounted on a common axis. Since for maximum speed these lamellae are actuated from their hubs, the outermost hub will necessarily have an especially large outside diameter, and further disadvantage is that such a shutter operating mechanism which has to actuate coaxial hubs is expensive to manufacture.

SUMMARY OF THE INVENTION

In the present invention the difficulties of the prior art are avoided by providing a plurality of pivot bearings for the individual lamellae and by actuating the latter by means of pin and slit connections.

This arrangement results in an especially small and lightweight shutter mechanism. The slit forming edges of each swinging sector can therefore be formed from a single lamella, but can also be formed by a plurality of adjacent lamellae. The latter construction produces a very compact shutter.

In comparison with the known slitted shutters with rigid telescopically collapsible individual blades, the shutter of this invention has only a very small intrinsic moment of inertia, resulting in increased shutter speed.

For actuating the lamellae of each swinging sector, simple pin and slit connections are provided. The pin of each sector is then carried either by a slit forming lamella of each sector which is itself actuated by a coaxial shaft, or is mounted on a special actuating lever whose axis of rotation can be positioned quite independently of the lamellae. It can be positioned especially in such a manner that the actuating lever and the pivoted sector will rotate in opposite directions which can be taken advantage of to cancel out their respective moments of inertia. The lever which actuates the advancing pivoted sector in front of it can also be provided with an impact surface of such a kind that when the lamellae arrive at the end of their movement and arrive at their positions outside of the picture window, they will simultaneously encounter that surface. In that manner the vibrations which would otherwise result from stopping the swinging sector are counteracted internally and will not be transmitted to the framework of the camera. The advancing pivoted sector is designated here and in the subsequent description as the sector which covers the picture window when the shutter is tensioned and which is the first to be actuated when the shutter is released.

There can also be provided spring brakes for at least the lamellae of the advancing pivoted sectors, the spring pressures of which are exerted transverse to the direction of movement of the lamellae and which capture the lamellae at the ends of their movements.

BRIEF DESCRIPTION OF THE DRAWINGS

In the drawings are shown two forms of this invention.

FIG. 4 shows a schematic view of the lamellae in their closing positions in a first form of this invention;

FIG. 4a shows a detailed view of the spring brake;

FIG. 5 shows a schematic view of the lamellae of the shutter in a second form of this invention;

DESCRIPTION OF THE PREFERRED EMBODIMENTS

Figure 1:
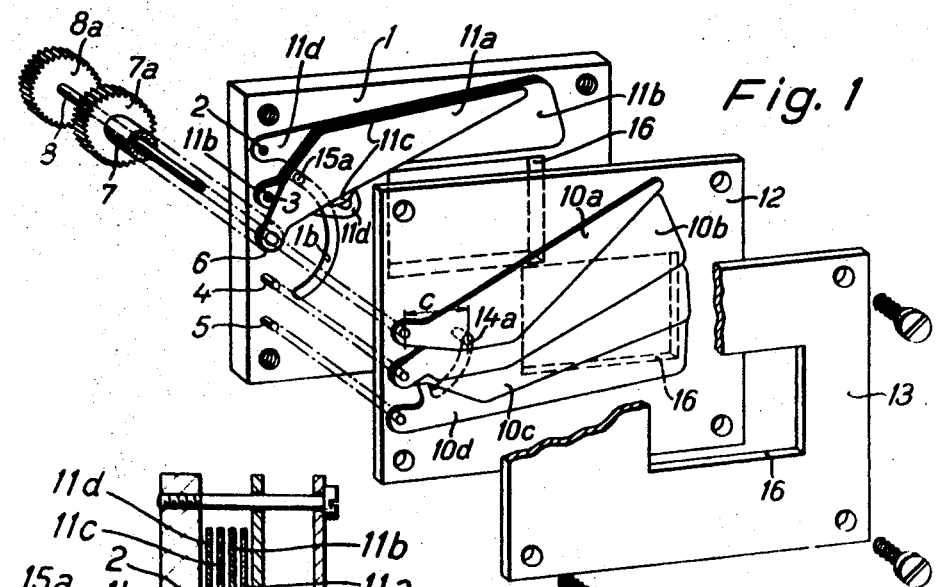
FIG. 1 shows in perspective and partly in section a shutter according to this invention.

In FIG. 1 the base plate 1 of the shutter carries four bearing studs 2, 3, 4 and 5 upon which the covering lamellae of both swinging sectors are pivoted. The base plate 1 also has a boring 6 for the hollow shaft 7 and for a second shaft 8 which extends through the hollow shaft 7. Both shafts are rotatable independently of each other, and the slit forming lamella of each pivoted sector is firmly mounted on one of the shafts. At their other ends the shafts 7 and 8 carry spur gears 7a and 8a by means of which the pivoted sectors are operated.

The two pivoted sectors consist of individual lamellae which are movable relative to each other in fanlike formation. In FIG. 4 the lamellae of the advancing pivoted sectors are spread out in fanlike formation of four lamellae 10a, 10b, 10c and 10d, the lamella 10a being the slit forming lamella and the lamellae 10b—10d the covering lamellae.

The trailing pivoted sectors consist of lamellae 11a to 11d where lamella 11a is likewise the slit forming lamella. In FIG. 4 all of these lamellae are shown as a fanlike or telescopically collapsed package. When in this position they represent the shutter in its tensioned condition. The covering lamellae 10b and 10c are then pivoted coaxially on the stud 4 while the lamella 10d is pivoted on stud 5. In the same manner the stud 3 carries the lamellae 11b and 11c while lamella 11d is rotatable on stud 2.

In FIG. 4 the studs 2 to 5 are shown with their axes in the same plane, but they could also be positioned in different planes which, however, would necessitate changes in their shapes and in the shapes of the curved slits.

Figure 3:
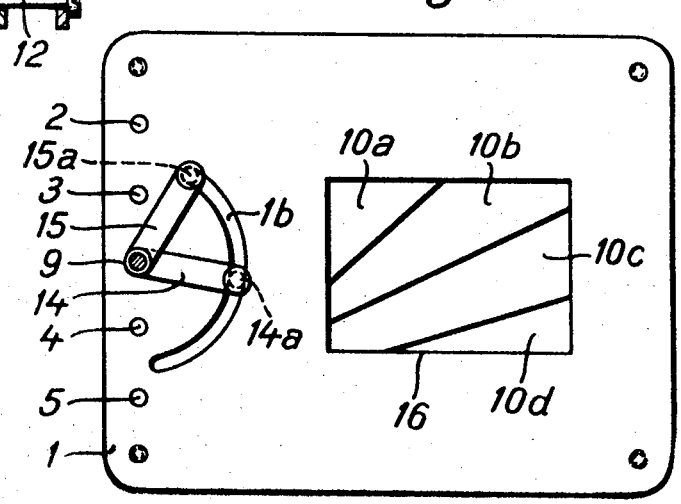
FIG. 3 shows a rear view of the shutter.

The slit forming lamellae 10a and 11a are pivotally supported between the studs 3 and 4, either each on its own actuating shaft as in FIG. 1, or both upon the same stud 9 as in FIGS. 3 and 4. Both lamellae can, however, be mounted on separate studs.

Figure 2:
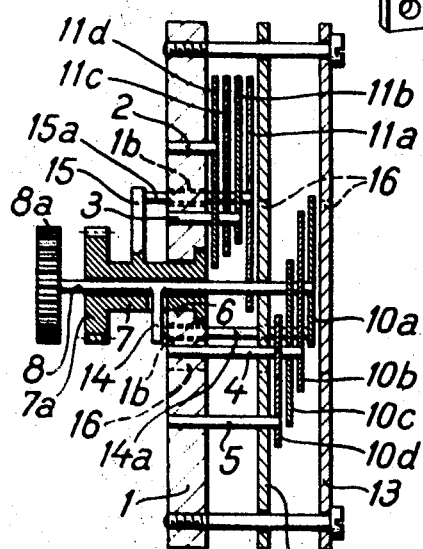
FIG. 2 shows a side view of the shutter.

FIGS. 1 and 2 show that between the two swinging sectors a separating plate 12 is interposed to prevent adjacent lamellae of the two sectors from hooking onto each other. On the side away from the base plate 1, the entire shutter is also covered by the cover plate 13.

For the actuation of the individual lamellae of each swinging sector, a pin/slit hole actuating means is provided, and can have different forms. It can be generated from the center of rotation of the slit forming lamellae, or from some other center of rotation. In FIGS. 1 to 4 the actuation is transmitted through the axes of rotation of the lamellae 10a and 11a. Necessarily the lamellae of each swinging sector will then be actuated by their individual actuating levers. Thus in FIGS. 2 and 4 the lamellae 10a to 10d of the advancing sector are actuated by the actuating lever 14 which is rigidly fastened to the shaft 8. At its free end the lever 14 carries a pin 14a which extends through an arcuate slit 1b (FIGS. 2 and 3) in the base plate 1 and into similarly formed slits in lamellae 10a to 10d.

In a similar manner the lamellae 11a to 11d of the trailing swinging sector are actuated by the lever 15 which is attached to the hollow shaft 7 and carries a pin 15a its free end which extends likewise through the arcuate slit 1b in the base plate 1 and through curved slits in lamellae 11a to 11d.

If, for example, the spur gear 8a is rotated, the shaft 8 will be rotated therewith, together with the actuating lever 14, which by means of its pin 14a will swing the lamellae 10a to 10d clockwise in the direction of the arrow A in FIG. 4, thereby opening the picture window 16. The edge 10a' of lamella 10a then serves as a slit forming edge which will sweep like a radius across the picture window with the bearing stud 5 as a pivot center. In the lower portion of FIG. 4 in the lamellae 10a to 10d will collapse into a package and their impact will be softened by spring brakes 17 and 18 which will press laterally upon the lamellae in a direction transverse to their swinging movements.

The picture window 16 will then be closed again by means of the spur gear 7a and the hollow shaft 7 which will swing the actuating lever 15 in the direction of the arrow B in FIG. 4 so that the pin 15a on the end of the lever will swing down the lamellae 11a to 11d which were until then in collapsed condition, but which will then spread out and cover the picture window at the end of their downward movement. The edge 11a' of the advancing lamella 11a then serves as the slit forming edge. During the closure tensioning step the two spur gears 7a and 8a are rotated back in unison so that both swinging sectors will be swung up simultaneously in such manner that the lamellae 10a and 11a will continually overlap each other at their adjacent edges.

In FIG. 1 there has been disclosed in detail a somewhat different actuating mechanism which differs from the one previously described in that the actuating levers 14 and 15 are eliminated. Instead, the lamellae 10a and 11a are rigidly secured to shafts 7 and 8 and the pins 14a and 15a are carried directly by these lamellae, the distance C on lamella 10a being equal to the effective length of actuating lever 14 in FIGS. 2 to 4.

Figure 6:
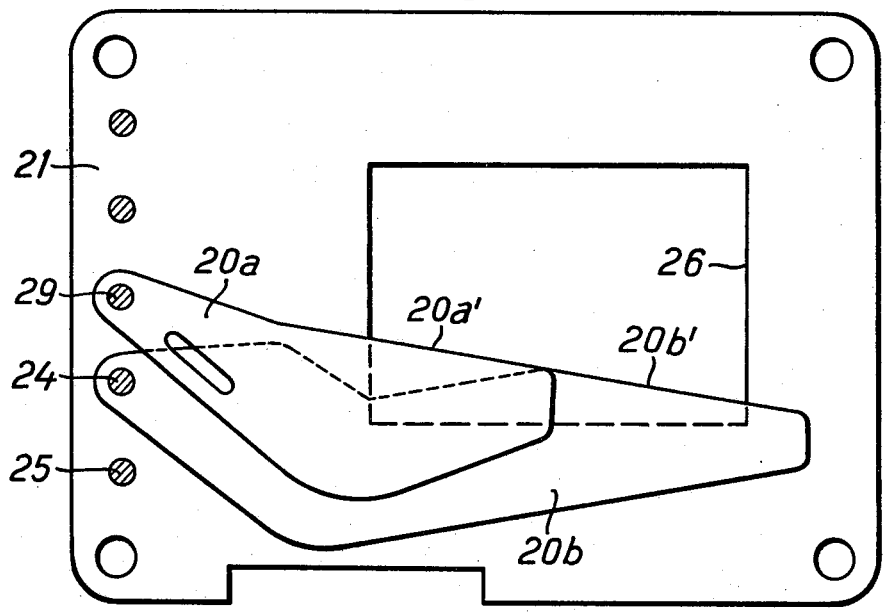
FIG. 6 shows a schematic view of the slit forming lamellae in a first functional phase of the second form of this invention.
Figure 7:
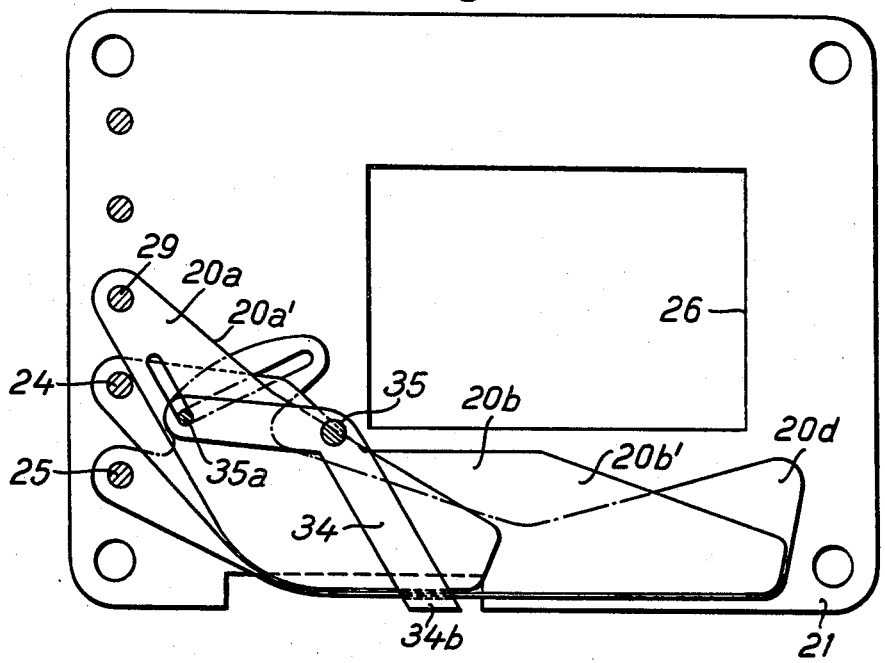
FIG. 7 shows schematically the positions of the slit forming lamellae in a second functional phase of the second form of this invention.

A feature that is common to all the shutters of FIGS. 1 to 4 is that the slit forming edges 10a' and 11a' are always formed by one lamella, whereas in the shutters of FIGS. 5 to 7, the slit forming edges are always formed of two lamellae.

In FIG. 5, for greater clarity, only the advancing pivoted sector with its lamellae has been shown. The trailing pivoted sector should be considered as being associated symmetrically therewith, exactly as in FIG. 4. The sector that is shown consists of lamellae 20a to 20e of which lamella 20a is carried by stud 29, lamellae 20b and 20c on stud 24 and lamellae 20d and 20e on stud 25. In these modifications, the slit formers are constituted of two portions 20a' and 20'b (FIG. 6) of lamellae 20a and 20b which, as soon as they sweep across the picture window, come into alignment with each other. Within the angle in which these two edges sweep across the picture window, they will deviate only little from exact alignment, such deviation being too small to have any effect on the exposure time. FIG. 6 shows the lamellae 20a and 20b schematically with their edges 20a' and 20b' approximately in alignment. The separation of the slit forming edges on the edges of two neighboring lamellae has above all the advantage of greater compactness of shutter structure. Comparing FIGS. 4 and 5 to 7, for example, where the shutters are all drawn to the same scale, it can be clearly seen that the horizontal and vertical dimensions of the cover plate 21 are considerably smaller in FIGS. 5 to 7 than the dimensions of the base plate 1 in FIG. 4.

Moreover, in the construction of FIGS. 5 to 7 a lamellae actuator is shown which is different from those of FIGS. 1 to 4, but which is shown in combination with the shutters of FIGS. 5 to 7 only as examples because the lamellae of FIGS. 1 to 4 can be actuated in a similar manner. The essential features of this lamellae actuating mechanism is that it does not act through the pivotal mountings of the lamellae and that the actuating lever 34 during the shutter closing movement swings in the opposite direction than the lamellae that are actuated thereby.

The actuating lever 34 is pivotally supported on the outside of a base plate, not shown, on an axis 35. At its free end the lever 34 carries a pin 35a which extends into the slits of lamellae 20a to 20e. During shutter closing movement the lever 34 swings counterclockwise in the direction of arrow D (FIG. 5).

The lamellae which are actuated by the lever 34 will be rotated however in the clockwise direction of the arrow E. These oppositely directed rotations will largely minimize their impacts against each other at the ends of their movements and thereby silence shutter operation.

The two-armed lever 34 carries at its other lever end a flat angular lug 34b to serve as an abutment for the lamellae 20a to 20e at the end of their swinging movements whereby the kinetic energies of the lever and the lamellae will neutralize each other since the resulting forces are all exerted in a closed system. FIG. 7 shows the end setting with the lamellae 20a to 20e supported by the lateral extension 34b.

Figure 8:
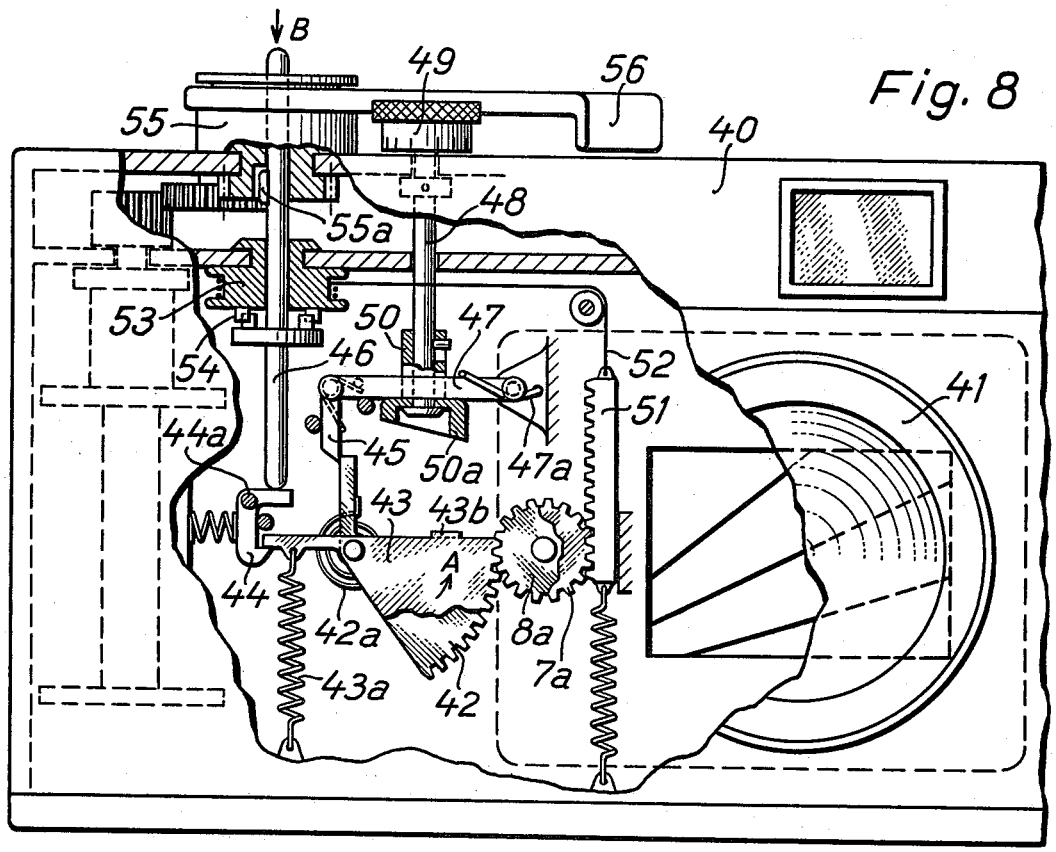
FIG. 8 shows a front view of a photographic camera wherein a swinging sector shutter according to the invention is incorporated.
Figure 9:
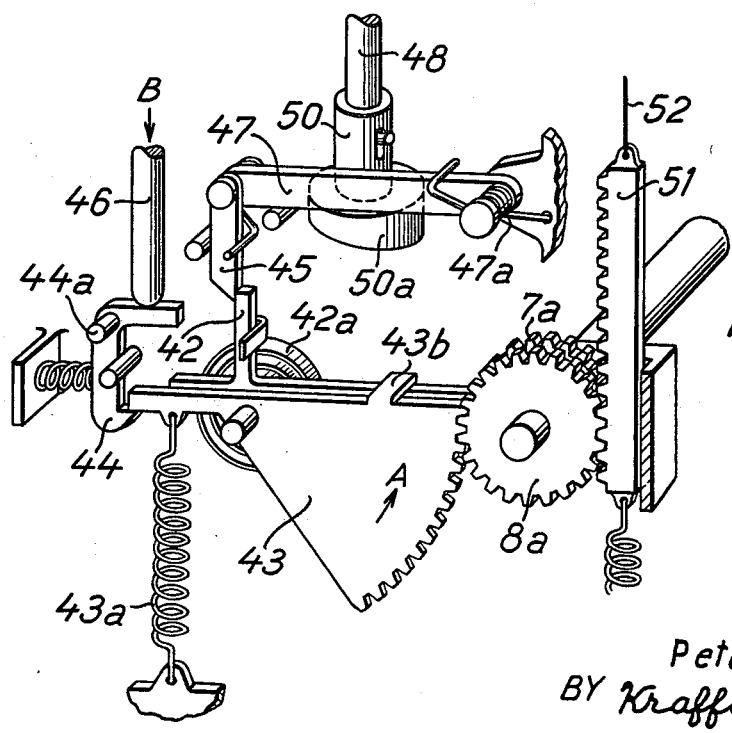
FIG. 9 shows a detailed perspective view of the shutter drive mechanism.

In FIG. 8 the above-described shutter is incorporated in a camera housing 40 together with a shutter drive and a shutter tensioning mechanism. The camera housing carries an objective 41 behind which the shutter is mounted inside the housing. The spur gears 7a, 8a are in mesh with two toothed sectors 42, 43 respectively. Two springs 42a, 43a act on the sectors, urging them to rotate in the direction of arrow A. The FIGS. 8 and 9 show the shutter in the tensioned position wherein the sectors 42, 43 are prevented from moving in the indicated direction by two locking levers 44, 45.

Locking lever 44 is a two-armed lever which is pivotable about a stationary pin 44a. One lever arm is in abutting contact with a shutter release bar 46, while the second lever arm retains sector 43 from being rotated by spring 43a.

Locking lever 45 is a one-armed lever pivotably mounted at the end of another one-armed lever 47 which is swingable about a stationary pin 47a.

Further, there is a time setting mechanism provided in the camera which mechanism consists mainly of a turnable shaft 48 journaled in the upper wall of the camera housing. Outside of the housing a setting knob 49 is positively secured to shaft 48, which knob carries a scale for the purpose of setting the desired shutter time. At the other end of shaft 48 there is a cartridge 50 mounted slidably by means of a pin and slot connection. Cartridge 50 has two different diameters, thus forming a shoulder whereon lever 47 rests with its lower edge, and the lower end of cartridge 50 is formed into an axial cam 50a against which sector 43 abuts when the latter swings upward after shutter release.

The above-described elements function as follows:

The shutter is released by pressing the release bar 46 in the direction of arrow B. This causes locking lever 44 to be pivoted in a clockwise direction thereby releasing sector 43. Consequently, sector 43 rotates in a counterclockwise direction under the influence of the force of spring 43a thereby rotating spur gear 8a in a clockwise direction which results in opening the shutter as described hereinbefore.

At the end of its rotation sector 43 abuts against cam 50a which is displaced upwards along shaft 48. Thereby the lever 47 is also swung upwards which causes locking lever 45 to release sector 42. Sector 42 now also swings upward thereby rotating spur gear 7a, as a consequence whereof the shutter is closed.

By turning shaft 48 it is possible to vary the exact moment at which sector 43 comes into contact with cam 50a. This causes the cartridge 50 and lever 47 to be lifted at different moments, sooner or later, relative to the beginning of the rotation of sector 43, i.e. the shutter is closed sooner or later after shutter opening.

Tensioning of the shutter after a previous shutter release is accomplished by a rack 51 which is in mesh with spur gear 8a. Rack 51 is operated by a cable 52 the other end of which is fastened to a reel 53, the latter being freely rotatable on an inner wall of the camera housing. The release bar 46 extends through a hole in reel 53 and is connected thereto by means of a releasable coupling 54. By means of a tongue and groove connection 55a the release bar 46 is also in driving engagement with a spur gear 55 which is solidly connected to the shutter tensioning and film advance lever 56.

If lever 56 is operated spur gear 55 rotates with it. Via the tongue and groove connection 55a it also causes the release bar 46 to rotate which, in turn, rotates reel 53. Thus, the cable 52 is wound on the reel 53 thereby moving rack 51 back into its upper position. Rack 51 drives spur gear 8a, and the latter rotates sector 43 which is thereby moved from its shutter released position back to the shutter tensioned position. A bent portion 43b engages sector 42 and also moves sector 42 back to the tensioned position.

During shutter release the release bar 46 is pressed downwards so that the bar becomes disengaged from reel 53. As a consequence thereof reel 53 can rotate freely so that rack 51 can move together with spur gear 8a.

It will be understood that his invention is susceptible to modification in order to adapt it to different usages and conditions and, accordingly, it is desired to comprehend such modifications within this invention as may fall within the scope of the appended claims.

I claim:

1. A swinging sector camera shutter comprising first and second swinging sectors, each swinging sector including a plurality of aligned bearing studs, and a plurality of lamellae, each of said lamellae being mounted for rotary motion about the axis of a corresponding bearing stud upon actuation of the shutter and the interaction of a pin and slit device connected to the lamella of each said sector effecting actuation of the sectors.

2. The swinging sector camera shutter of claim 1, wherein one lamella (10a, 11a) defines each slit forming edge of each swinging sector.

3. The swinging camera shutter of claim 1, wherein a plurality of neighboring lamellae (20a, 20b) define slit forming edges of each swinging sector.

4. The swinging sector camera shutter of claim 3, wherein a shorter slit forming lamella (20a) is disposed between two neighboring lamellae (20b, 20c) of the same swinging sector.

5. The swinging sector camera shutter of claim 1, wherein each swinging sector is provided with a separate actuating lever (14, 15) with the two levers disposed in separate planes parallel to the lamellae swinging planes and each lever carries a pin (14a, 15a) perpendicular to its plane of swing, said pins extending into arcuate slits in the lamellae whereby the lamellae are actuated with the lever during movement of the latter.

6. The swinging sector camera shutter of claim 5, wherein each actuating lever (14, 15) is actuated in the same direction of rotation as the lamellae that are associated therewith.

7. The swinging sector camera shutter of claim 5, wherein the actuating levers (14, 15) are actuated in directions of rotation opposite to those of their associated lamellae.

8. The swinging sector camera shutter of claim 7, wherein the actuating lever (34) of the advancing swinging sector has an abutment surface on its leading edge whereby all lamellae encounter said abutment when they reach their end position after having cleared the picture window.

9. The swinging sector camera shutter of claim 2, wherein each of the two slit forming lamellae is mounted coaxially with an actuating shaft and carries on it a pin perpendicular to its plane of swing, said shaft extending into arcuate slits in the remaining lamellae whereby the latter are actuated with the movement of the slit forming lamella.

10. The swinging sector camera shutter of claim 4, wherein the shorter one of the slit forming lamellae of each swinging sector is rigidly connected coaxially with an actuating shaft, said slit forming lamella carrying a pin perpendicular to its plane of swing and extending into arcuate slits in the remaining lamellae whereby the latter are actuated with it during its swinging movement.

11. The swinging sector camera shutter of claim 1, wherein spring brakes (17, 18) are provided for the lamellae of at least the advancing swinging sector, the brakes having means for exerting their spring pressure perpendicularly to the direction of movement of the swinging sectors.

12. The swinging sector camera shutter of claim 1, wherein the swinging sectors are positioned between a base plate (1) and a cover plate (13), with a separating plate (12) between the lamellae of the advancing sector and those of the trailing sector.

13. The swinging sector camera shutter of claim 1, wherein one or two lamellae of each sector define slit formation whereby photographic exposure occurs in either direction of movement of the swinging sectors.